(12) United States Patent
Foo et al.

(10) Patent No.: US 12,089,008 B2
(45) Date of Patent: *Sep. 10, 2024

(54) REMOTELY UPDATING A HEARING AID PROFILE

(71) Applicant: Apple Inc., Cupertino, CA (US)

(72) Inventors: Edwin W. Foo, Sunnyvale, CA (US); Gregory F. Hughes, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,714

(22) Filed: Feb. 14, 2023

(65) Prior Publication Data
US 2023/0276184 A1 Aug. 31, 2023

Related U.S. Application Data

(63) Continuation of application No. 17/404,744, filed on Aug. 17, 2021, now Pat. No. 11,595,766, which is a continuation of application No. 16/398,589, filed on Apr. 30, 2019, now Pat. No. 11,102,593, which is a continuation-in-part of application No. 15/436,064, filed on Feb. 17, 2017, now abandoned, which is a continuation of application No. 13/009,751, filed on Jan. 19, 2011, now Pat. No. 9,613,028.

(51) Int. Cl.
H04R 25/00 (2006.01)
G06F 40/58 (2020.01)

(52) U.S. Cl.
CPC ........... *H04R 25/558* (2013.01); *G06F 40/58* (2020.01); *H04R 25/50* (2013.01); *H04R 2225/39* (2013.01); *H04R 2225/41* (2013.01); *H04R 2225/55* (2013.01)

(58) Field of Classification Search
CPC ...... H04R 25/558; H04R 25/50; H04R 25/70; H04R 25/305; H04R 25/505; H04R 2225/39; H04R 2225/41; H04R 2225/55; G06F 40/58
See application file for complete search history.

(56) References Cited

U.S. PATENT DOCUMENTS

| | | | |
|---|---|---|---|
| 11,595,766 B2 * | 2/2023 | Foo | H04R 25/558 |
| 2005/0249368 A1 * | 11/2005 | Menzl | H04R 25/70 381/313 |
| 2005/0260985 A1 * | 11/2005 | Rader | H04R 25/70 455/432.3 |
| 2009/0047994 A1 * | 2/2009 | Sommer | H04L 67/125 455/556.1 |
| 2009/0199274 A1 * | 8/2009 | Frazier | H04L 63/08 726/4 |
| 2011/0176697 A1 * | 7/2011 | Apfel | H04R 25/305 381/314 |
| 2011/0200217 A1 * | 8/2011 | Gurin | A61B 5/123 381/320 |

* cited by examiner

*Primary Examiner* — Yogeshkumar Patel
(74) *Attorney, Agent, or Firm* — Aikin & Gallant, LLP

(57) ABSTRACT

Broadly speaking, the embodiments disclosed herein describe replacing a current hearing aid profile stored in a hearing aid. In one embodiment, the hearing aid profile is updated by sending a hearing aid profile update request to a hearing aid profile service, receiving the updated hearing aid profile from the hearing aid profile service, and replacing the current hearing aid profile in the hearing aid with the updated hearing aid profile.

20 Claims, 9 Drawing Sheets

REMOTELY UPDATING A HEARING AID PROFILE

This application is a continuation of U.S. application Ser. No. 16/398,589 filed Apr. 30, 2019, which is a continuation-in-part of U.S. application Ser. No. 15/436,064 filed on Feb. 17, 2017, which is a continuation of U.S. application Ser. No. 13/009,751 filed Jan. 19, 2011, now issued as U.S. Pat. No. 9,613,028.

FIELD OF THE DESCRIBED EMBODIMENTS

The described embodiments relate to method, system and apparatus for processing and/or enhancing audio signals used by a hearing aid. In particular, techniques for providing real time adjustment of a hearing aid audio processing are described.

DESCRIPTION OF THE RELATED ART

A modern hearing aid can help to mitigate at least some of the problems associated with impaired hearing by amplifying sound. A modem hearing aid can receive an input audio signal using an input converter. The audio input signal can in turn be converted into electrical input signals that are routed to a signal processing unit for further processing and amplification. The further processing and amplification can be used to compensate for the individual loss of hearing of a hearing aid wearer. The signal processing unit provides an electrical output signal which is fed via an output converter to the wearer of the hearing aid so the wearer perceives the output signal as an audio signal. Earpieces which generate an audio output signal are usually used as output converters.

Every electronic hearing aid has, at minimum, a microphone, a loudspeaker (commonly called a receiver), a battery, and electronic circuitry. The electronic circuitry varies among devices, even if they are the same style. The circuitry falls into three categories based on the type of audio processing (Analog or Digital) and the type of control circuitry (Adjustable or Programmable). In one category, the audio circuit is analog having electronic components that can be adjusted. With these types of hearing aids, a hearing professional (such as an audiologist or certified technician) determines the gain and other specifications required for the wearer, and then adjusts the analog components either with small controls on the hearing aid itself or by having a laboratory build the hearing aid to meet those specifications. After the adjustment is completed, the resulting audio processing does not change any further, other than possibly the overall loudness that the wearer adjusts with a volume control. This type of circuitry is generally the least flexible.

In another category, the audio circuit is analog but with additional electronic control circuitry that can be programmed, sometimes with more than one program. The electronic control circuitry can be fixed during manufacturing or in some cases, the hearing professional can use an external computer temporarily connected to the hearing aid to program the additional control circuitry. The wearer can change the program for different listening environments by pressing buttons either on the device itself or on a remote control or in some cases the additional control circuitry operates automatically.

This type of circuitry is generally more flexible than simple adjustable controls. In yet another category, both the audio circuit and the additional control circuits are fully digital in nature. The hearing professional programs the hearing aid with an external computer temporarily connected to the device and can adjust all processing characteristics on an individual basis. Fully digital hearing aids can be programmed with multiple programs that can be invoked by the wearer, or that operate automatically and adaptively. These programs reduce audio feedback (whistling), reduce background noise, detect and automatically accommodate different listening environments (loud vs. soft, speech vs. music, quiet vs. noisy, etc.), control additional components such as multiple microphones to improve spatial hearing, transpose frequencies (shift high frequencies that a wearer may not hear to lower frequency regions where hearing may be better), and implement many other features. In some embodiments, the hearing aid wearer has almost complete control over the settings of most, but not all, settings. For example, in order to prevent unintended harm to the wearer, certain settings (such as gain) can only be changed within a well-defined range. Other settings, such a frequency response, can have more latitude but any allowed changes will nonetheless be restricted in order to prevent any changes to the audio processing that may be harmful to the hearing aid wearer.

Fully digital circuitry can also include wireless hearing aids that allow control over wireless transmission capability for both the audio and the control circuitry. Control signals in a healing aid on one ear can be sent wirelessly to the control circuitry in the hearing aid on the opposite ear to ensure that the audio in both ears is either matched directly or that the audio contains intentional differences that mimic the differences in normal binaural hearing to preserve spatial hearing ability. Audio signals can be sent wirelessly to and from external devices through a separate module, often a small device worn like a pendant and commonly called a "streamer" that allows wireless connection to yet other external devices. In those embodiments where additional computational resources or sensor resources are required, the external devices can take the form of a portable computing device along the lines of a smart phone, tablet device, and portable media player.

Programmable hearing aids that allow a user to adjust the hearing aid response to their own preference have been recently made available at reasonable cost. Using the programmable hearing aid, for example, the frequency response of the hearing aid can be adjusted by the consumer in order to improve the overall user experience by accentuating certain frequencies or range of frequencies. In addition to programmable hearing aids, wireless healing aids have been developed. For example, for a hearing impaired consumer using two hearing aids, an adjustment to one of the two hearing aids can be transmitted to the other hearing aid such that pressing one hearing aid's program button simultaneously changes the corresponding settings on the other hearing aid such that both hearing aids change settings simultaneously.

Therefore, with the advent of programmable hearing aids whose signal processing can at least be partially modified, what is desired is allowing a hearing aid user to modify the audio processing of the programmable hearing aid in real time in accordance with the context for which the hearing aid is or will be used.

SUMMARY

Broadly speaking, the embodiments disclosed herein describe techniques, systems, and apparatus tailored to meet the needs of individuals having impaired hearing. More specifically, a mechanism is provided by which hearing aid users can in real time communicate with a remotely located hearing aid profile provider.

In one embodiment, the communication between the hearing aid user and the remotely located hearing aid profile provider can include a request to update a hearing aid profile currently used by the hearing aid to process audio signals. In this way, audio processing characteristics of the hearing aids can be modified based upon at least some of the information passed between the requestor and provider. A method for updating a hearing aid profile stored in a hearing aid can be carried out by performing at least the following: establishing a data link between the hearing aid and a hearing aid profile service, sending a hearing aid profile update request to a hearing aid profile service, receiving an updated hearing aid profile from the hearing aid profile service at the hearing aid, processing audio received at the hearing aid in accordance with the updated hearing aid profile, evaluating the processed audio, and saving the updated hearing aid profile at the hearing aid when the evaluation is acceptable.

A method for generating an updated hearing aid profile used in a hearing aid to process sound is described. The method is performed by carrying out the following operations at a hearing aid profile service: receiving a hearing aid profile update request, receiving an audio sample that includes sound recorded by the hearing aid and meta-data indicating a target audio component, generating the updated heating aid profile in accordance with the audio sample and the meta-data, and sending the updated heating aid profile to the hearing aid.

A system includes at least a programmable hearing aid. In the described embodiment, the hearing aid includes a hearing aid processor and a memory arranged to store a hearing aid profile that includes at least a plurality of audio processing instructions executed by the hearing aid processor. In one embodiment, the hearing aid is in communication with a personal computing device (PCD) that includes a PCD processor, a data storage device, and a network interface arranged to establish a communication channel to a remote hearing aid profile service over a network. The heating aid profile is updated by the personal computing device by sending a hearing aid profile update request to the hearing aid profile service over the communication channel, receiving the updated hearing aid profile from the hearing aid profile service over the communication channel, and writing the updated hearing aid profile to the programmable memory.

Non-transitory computer readable medium executable by a processor in a personal computing device coupled with a hearing aid for replacing a current hearing aid profile stored in the hearing aid is described. The non-transitory computer readable medium includes at least computer code for establishing a data link between the hearing aid and a hearing aid profile service, computer code for sending a hearing aid profile update request to the hearing aid profile service, computer code for receiving an updated hearing aid profile from the hearing aid profile service at the hearing aid, computer code for processing audio received at the hearing aid in accordance with the updated hearing aid profile, computer code for evaluating the processed audio, and computer code for saving the updated hearing aid profile at the hearing aid when the evaluation is acceptable.

Other aspects and advantages will become apparent from the following detailed description taken in conjunction with the accompanying drawings which illustrate, by way of example, the principles of the described embodiments.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

Figure 1:
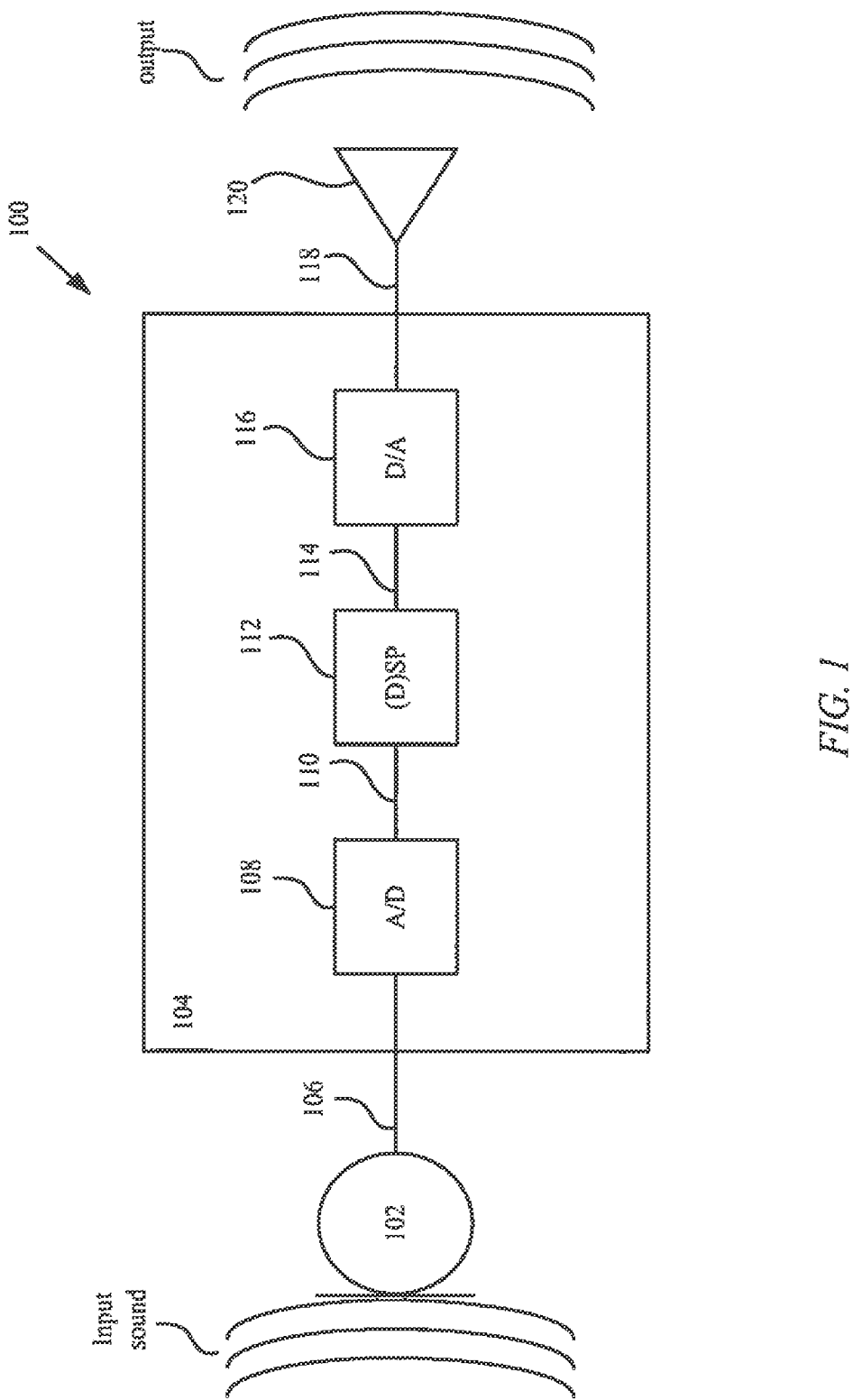
FIG. 1 shows a representative hearing aid in accordance with the described embodiments.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

The audio processing performed by the audio circuitry can be based upon a number of hearing aid parameters that can be changed by adjusting controls or by programming. Such hearing aid parameters can include frequency response (e.g., signal edge displacement, rise time in the low and high tone range), gain, starting point of AGC, peak clipping, and so forth. For optimal performance, a particular audio environment can have associated with it a particular range of hearing aid parameters that can be further adjusted for the individual user. However, in order to properly adjust the audio processing of the audio circuitry, a potentially large number of hearing aid controls must be adjusted on a real time basis. Since the hearing aid user can only freely adjust relatively few parameters such as volume or gain, one of the described embodiments utilizes a hearing aid parameter profile, or more simply, HA profile.

In one embodiment, the HA profile can include a set of parameters that can represent the context of the environment for which the HA profile is associated. The HA profile can be selected by the individual user to adjust the processing carried out by the audio circuitry on the audible sounds received from the external environment. In one embodiment, the HA profile can include a range of hearing aid parameters specific to the individual user. The parameters can be established by an audio technician under the guidance of a certified audiologist (or by the audiologist directly) in a location removed from the immediate vicinity the requesting user.

In one embodiment, when the hearing aid user would like to have a current HA profile modified, the hearing aid user can send a request to an HA profile service, the HA profile service can be local or remote. The HA profile service can include a certified technician, audiologist, or even to an audiologist call center where a number of audiologists (or certified technicians) are on call and available to provide a response. As part of the request, the hearing aid user can provide meta-data. Meta-data can provide useful information that can be used by the HA profile service to modify the current HA profile. For example, the meta-data can include information such as current location, venue (rock concert, library, etc.) and so on that can provide a context of use that can be used by the HA profile service to modify the HA profile in a manner consistent with the hearing aid user's current situation.

In one embodiment, the hearing aid user can include a calibration audio file in the HA profile update request. The calibration audio file can include known audio data. The known audio data can be used to compare how sound is affected by the local environment. In this way, the calibration audio file can be used to determine the audio characteristics of the local environment of the hearing aid user. The audio characteristics can include an amount of reverberation (or reverb), echo and so forth. In one embodiment, audio noise can be characterized using the calibration audio file. In the context of this discussion, audio noise can include general background audio noise different from and unrelated to a target audio, the target audio being that audio of primary interest to the hearing aid user. For example, at a rock concert, the target audio can be the music being played or to be played whereas audio noise can include the sounds of the crowd. For example, the calibration audio file can include a known audio component (such as a tone of a known frequency) that can be used as a reference that can be used to determine the effects that the local environment has on sound.

Associated with the HA profile update request, the hearing aid user can provide a calibration audio file and an audio sample. The audio sample can be any length. For example, the audio sample can be short (about 15 seconds or so) along the lines of an audio snippet. On the other hand, the audio sample can extend to a greater length of time, on the order of several minutes if necessary. In any case, the audio sample can take the form of audio recorded and stored in a data storage device. In one embodiment, the data storage device can be included in a personal computing device, or PCD, in possession of or in the vicinity of the hearing aid user arranged to receive, record, and store the recorded audio sample. In one embodiment, a log of audio samples can be maintained. In one embodiment, at least some of the audio samples maintained in the audio sample log can have associated meta-data. The meta-data can include information related to various aspects of the recorded audio. For example, the meta-data can take the form of an image or a video of the local surroundings that can be used to characterize the ambient audio environment corresponding to the audio sample.

For example, if the image indicates that the audio sample was recorded indoors in a room, then the image(s) can indicate physical attributes of the room (size, position and condition of walls, ceiling, placement of furniture, and so on) that can affect sound generated within the room. In this way, the HA profile service can take these factors into consideration in response to the HA update request. Using the calibration audio file and the audio sample meta-data, the HA profile service can distinguish a noise component of the sound from a target audio component. In one embodiment, the hearing aid user can identify the target audio component by using the meta-data to identify the target audio component ("I am at a Beatles concert"). Once the noise has been characterized, the HA profile can be modified to include a noise cancellation parameter, or vector, that can be used to cancel or at least substantially reduce an amount of noise that is processed and outputted by the heating aid.

In one embodiment, the heating aid user can provide a commentary as part of the meta-data associated with the audio sample file that can be stored and made available at a later time for updating the HA profile. For example, if the hearing aid user is having a particularly good (or bad) audio experience, the hearing aid user can be presented with the option of recording the current audio environment to form the audio sample file. The hearing aid user can then annotate the audio sample file with commentary all of which can be stored for subsequent retrieval and used in updating the HA profile. In this way, the hearing aid user can provide the HA profile service with both subjective feedback and objective audio data for improvement in the HA profile. The audio sample file and associated meta-data can be stored in the audio file log.

In one embodiment, the calibration audio file can include audio data that is known and can therefore be used to characterize the audio environment of the hearing aid user. For example, the calibration audio file can include baseline audio data. The baseline audio data can take many forms. For example, the baseline audio data can take the form of a frequency in the form of a single tone or a series of tones representing a single or a small range of frequencies. In one embodiment, a representation of a manner in which a known physical environment changes the audio characteristics of the calibration audio file can take the form of a template or audio model. The audio model can indicate a manner in which the physical environment modifies the audio data in the calibration audio file.

For example, a tone or series of tones in the calibration audio file can correspond with a range of frequencies typically affected in those individuals suffering from age related hearing impairment in which higher frequencies are disproportionately affected. Therefore, by comparing the tones (or tones) in the calibration audio file received by the HA provider service with the known baseline tones, an estimation of the audio model can be made. The audio model being an estimation of the overall changes in the audio caused by the physical environment in which the audio is generated. For example, if the original audio is generated in a local environment that suppresses high frequencies, then this effect can be estimated and corrected for by comparing the audio signals from the calibration audio file with those signals generated in room. The difference being an estimation of the overall effect that the room has on sound.

In one embodiment, the calibration audio file can include an audio data considered important to the hearing aid user. For example, a user having age related hearing impairment requires processing received audio signals that enhance audio components that fall within a range of high frequencies. Therefore since it is this range of frequencies that is most important to the hearing aid user, the audio calibration file has audio data that is more heavily weighted with high frequency audio data corresponding to the range most affected. In this way, any noise components within the range of frequencies can be more readily detected and in some embodiments corrected.

In one embodiment, at least a portion of the calibration audio file can be played by, for example, a personal communication device. In one embodiment, the personal communication device can be a stand-alone unit or can be in communication with a hearing aid. In one embodiment, the calibration audio tile can be encoded in a digital format, such as MP3, and decoded by the personal communication device. In one embodiment, the decoded calibration audio file can be output by the personal communication device in the form of a calibration sound. The calibration sound can be received at the hearing aid and recorded for subsequent analysis. In one embodiment, the hearing aid can record and analyze the calibration sound. In one embodiment, the hearing aid can receive and record the calibration sound and transfer the recorded calibration sound to the personal communication device for further processing. In one embodiment, the calibration sound can be received at the hearing aid and recorded in the personal communication device where the subsequent processing takes place.

The analysis of the recorded calibration sound can include comparing the recorded calibration sound to the calibration audio file. The comparing can be used to determine audio correction factors that can be used to suppress or eliminate audio effects caused by environmental factors. In one embodiment, the correction factors can include a noise correction factor used to suppress or eliminate noise, noise being audio components other than a target audio component.

In one embodiment, the correction factors can be included in or otherwise associated with an updated hearing aid profile. The updated hearing aid profile can be used by the hearing aid to process audio received at the hearing aid. The correction factors can be used to correct for changes in the sound caused by the local environment of the hearing aid.

In one embodiment, a number of different HA profiles can be available based upon, for example, the audios of the immediate surroundings of the hearing aid user. For example, a first HA profile can be used for processing external audio emanating from a generally quiet background environment such as a library, whereas a second HA profile can be used to process external audio emanating from a noisy environment such as a rock concert. In one embodiment, the heating aid profile can be stored in a nearby computing device such as a personal computer. The HA profile can be transferred from the personal computer to the heating aid wirelessly or by way of a wired connection. In one embodiment, at least portions of the HA profile can be adjusted in real time to accommodate a new or modified external environment. In one embodiment, the HA profiles can be locally stored at the hearing aid. In one embodiment, the HA profiles can be stored at a nearby computing device that can take the form of a desktop computer such as an iMac™, a laptop computer such as a MacBook Pro™ or personal communication device, or PCD, such as an iPod™, or a smartphone such as the iPhone™ all of which are manufactured by Apple Inc. of Cupertino, CA.

The personal communication device can be configured to wirelessly receive and in most cases send a signal that can contain information related to an HA profile or a specific HA setting within an HA profile. For example, a hearing aid user can submit a hearing aid profile update request by communicating with an HA profile service over either wired or a wireless communication channel using a suitable wireless communication protocol such as Bluetooth (BT), WiFi, and so on. The communication channel can also take the form of a wired communication channel or a combination of both wireless and wired communication channels. In one embodiment, the hearing aid itself can use any available communication channel to communicate with other computing devices. For example, the hearing aid can wirelessly communicate with a portable personal computing device such as the iPod™, iPhone™, iPad™ and so on, each of which is manufactured by Apple Inc. of Cupertino, CA.

Using the iPhone™ as an example, a data link can be established between a server that allows the requestor to instantiate an HA profile request. In this way, the iPhone™ can display a user interface that can be used to select specific HA profiles (or overlays) associated with a particular venue, provide the HA profile service with an audio sample of the local audio environment, receive the updated HA profile and transfer the updated HA profile to requestor hearing aid. In one embodiment, the hearing aid user can choose to continue to use the selected HA profile (or overlay) or decide to select and download another HA profile (based, for example, on subjective considerations). In some embodiments, the hearing aid user can review the selected HA profile (or overlay) and post the review back to the server for posting to the HA profile service for further consideration of modifying the updated profile, storing the updated profile, and so on.

These and other embodiments are discussed below with reference to FIGS. 1-9. However, those skilled in the art will readily appreciate that the detailed description given herein with respect to these figures is for explanatory purposes as the described embodiments extends beyond these limited embodiments.

FIG. 1 is a block schematic showing hearing aid 100 in accordance with the described embodiments. Hearing aid 100 can include at least audio sensor 102 arranged to detect audio energy that can take the form of sound. In one embodiment, audio sensor 102 can take the form of (one or more) microphone 102 connected to an input node of audio processing circuitry 104. Microphone 102 can use, for example, a vibrating membrane that can mechanically respond to sound waves impinging on its surface. The vibrating membrane can interact with a transducer (not shown) to create electrical signal 106 that is analogous (i.e., analog) to the detected sound waves.

Analog signal 106 can be passed to audio processing circuitry 104 for processing. It should be noted that audio processing circuitry 104 can be totally analog in nature, whereas in other embodiments, audio processing circuitry 104 can have some components that are analog while other components are digital. However for the remainder of this discussion and without loss of generality, audio processing circuitry 104 will be considered as being fully digital in nature. Therefore, digital audio processing circuitry 104 can include analog to digital (A/D) converter unit 108 arranged to receive analog signal 106 generated by microphone 102. A/D converter unit 108 converts analog signal 106 into digital signal 110 using any suitable digitization process.

For example, A/D converter unit 108 can periodically sample analog signal 106, the sampled value of analog signal 106 being used to form digital signal 110. In one embodiment, an output node of A/D converter unit 108 can be connected to (digital) signal processor 112. DSP 112 can include at least additional signal processing circuits (not shown) for filtering, compressing and amplifying input digital signal 110 to form output digital signal 114 at an output node of DSP 112 that can, in turn, be connected to an input node of a digital/analog (D/A) converter 116. D/A converter 116 can convert digital signal 114 into a corresponding analog signal 118 at an output node of D/A converter 116 that can be connected to and be used to drive output 120. It should be noted, however, that in an alternative embodiment, DSP 112 can be configured in such a way to drive output 120 directly without requiring D/A converter 116.

It should be noted that output 120 can take many forms depending upon the nature of hearing aid 100. For example, in one embodiment, output 120 can take the form of an audio transducer arranged to provide audio output in the form of sound waves. The audio output can then be transmitted in a conventional manner to the hearing aid user's auditory system. In one embodiment, output 120 can be used to stimulate nerves in the hearing aid user's auditory system. In one embodiment, output 120 can be implanted into a bone near the hearing aid user's auditory system. In this way, electrical energy generated by output 120 can be transmitted through the bone and be used to stimulate certain auditory nerves. This type of hearing aid is generally described in terms of a cochlear implant.

In one embodiment, DSP 112 can be programmable by which it is meant that the audio processing carried out by DSP 112 can be widely varied. For example, DSP 112 can be programmed according to a hearing aid profile that can include a plurality of settings each of which can alter a corresponding audio processing operation. For example, the settings can include various frequency response curves (along the lines of an equalizer), gain control, filtering such as notch or band pass filtering and the like. In this way, hearing aid 100 can adapt its signal processing to a wide number of variables such as the environmental (i.e., ambient) noise level, room audio characteristics, user provided changes to parameters and so on.

In one embodiment, a hearing aid profile can include a set of rules relating to speech intelligibility implemented in DSP 112 that can be used to optimize the signal processing by, for example, reducing or even merely characterizing noise based on an analysis carried out by DSP 112. In one embodiment the signal processing can be used to improve overall signal reproduction to benefit intelligibility of speech in the reproduced audio signal. These rules are preferably based on the theory of the speech intelligibility index, but may be adapted to other beneficial parameters relating to audio reproduction in alternative embodiments. In an alternative embodiment, parameters other than the individual frequency band gain values can be incorporated as output control parameters. These values can, for example, be attack or release times for gain adjustments, compression ratio, noise reduction parameters, microphone directivity, listening program, frequency shaping, and other parameters. Alternative embodiments that incorporate several of these parameters can easily be implemented, and the selection of which parameters will be affected by the analysis may be applied by the hearing aid provider at the time of fitting the heating aid to the individual user, or subsequent to the fitting, using any number of techniques described herein.

Figure 2:
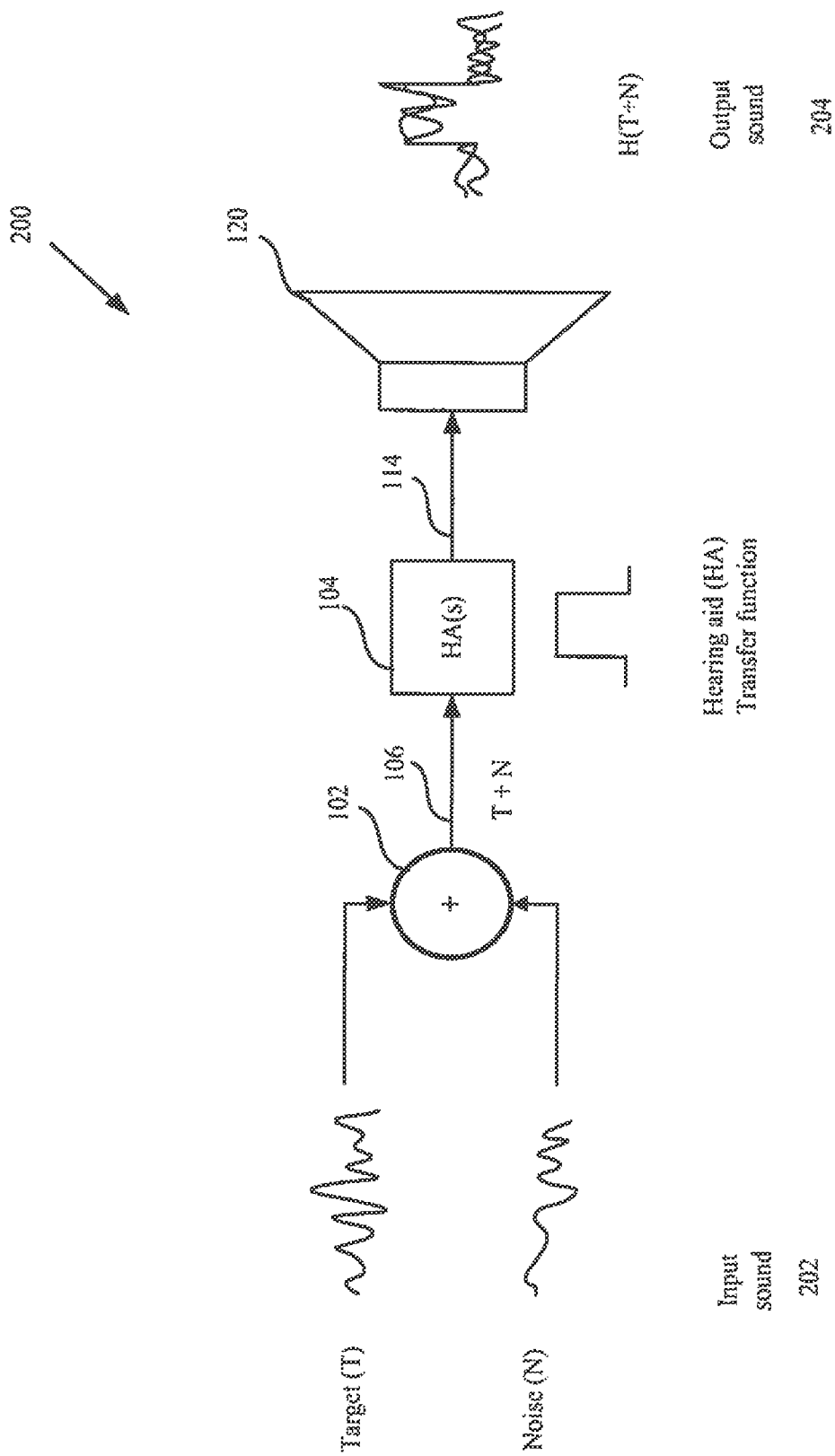
FIG. 2 illustrates a conventional hearing aid (HA) system where the hearing aid indiscriminately audio processes both a target audio signal and a noise signal using a conventional hearing aid transfer function.

FIG. 2 shows a functional representation 200 of HA 100. In particular FIG. 2 illustrates the manner in which HA 100 indiscriminately receives sound 202 at audio sensor 102. As shown, sound 202 can include target audio component T and noise component N. In the context of this discussion, target audio component T can include audio signals present in the local audio environment that the hearing aid user prefers to hear. On the other hand, other audio signals that the heating aid user prefers to not hear can be characterized as noise. For example, when the local audio environment is one consistent with a rock conceit, then target audio component T of the sound can include the audio signals corresponding to the music being played or that will be played, whereas the noise component N can include substantially anything else, such as traffic, audience noise, and so forth.

Therefore, audio sensor 102 can estimate the sound energy impinging on audio sensor 102 as analog signal 106. Analog signal 106 can include both target audio component T and noise component N each of which is processed by digital audio processing circuitry 104. Digital audio processing circuitry 104 can be mathematically represented as transfer function HA(s). Transfer function HA(s) can represent in mathematical terms the processing on analog signal 106 carried out by digital audio processing circuitry 104. In other words, the relationship between analog signal 106 and output signal 118 can be presented mathematically according to Eq. (1):

$$\text{Output signal} = \text{Input signal} \times HA(s) \qquad \text{Eq. (2)}.$$

In the situation shown in FIG. 2 where input signal 106 can include both target and noise components (i.e., T+N), output signal 118 can be represented by Eq. (2) as:

$$\text{Output signal} = \text{Input signal} \times HA(T+N) \qquad \text{Eq. (2)}.$$

Since digital audio processing circuitry 104 processes input signal 106 having both target audio component T and noise component N, output signal 118 can also include both target audio component T and noise component N. In this way, output sound 204 can include noise components that the hearing aid user can find distracting and unpleasant.

Figure 3:
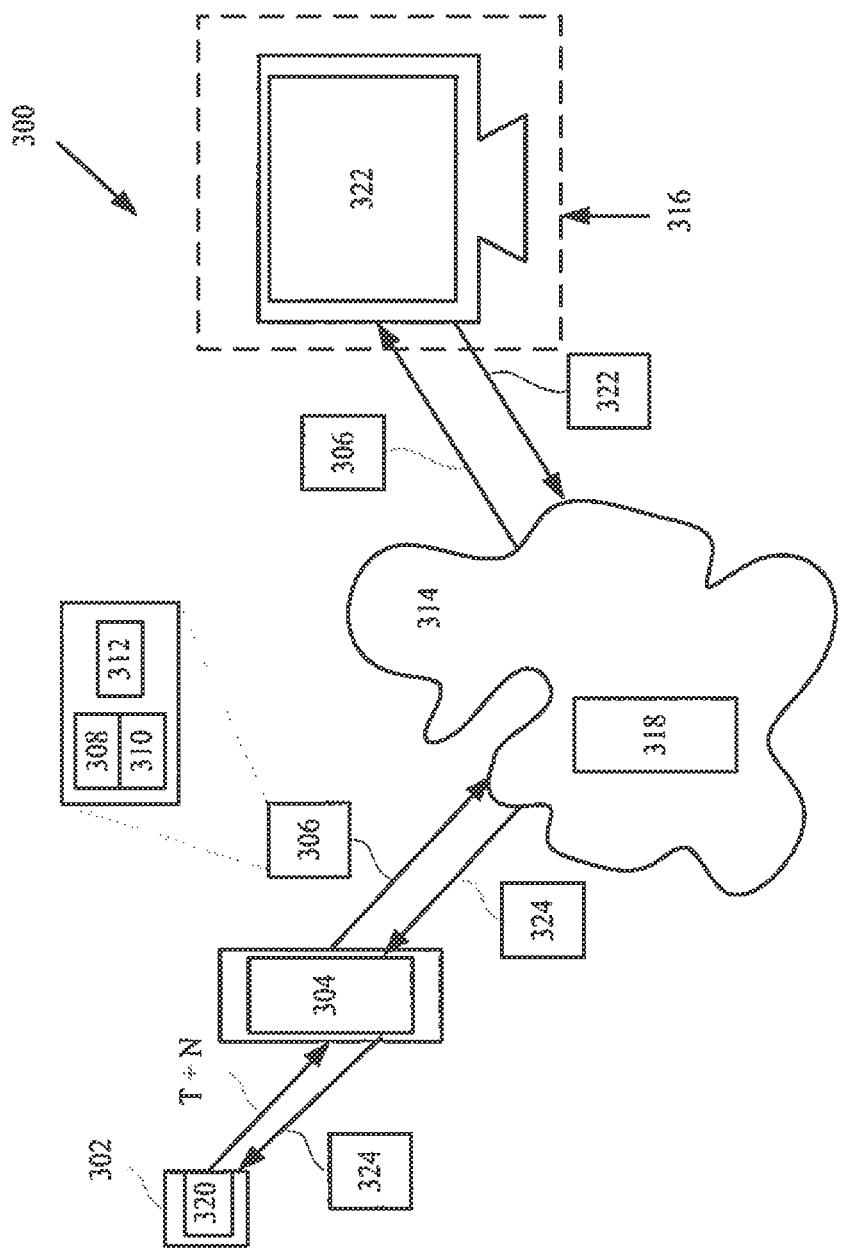
FIG. 3 shows a representative network transaction in accordance with the described embodiments for real time updating of a hearing aid audio processing.

FIG. 3 shows representative network 300 for requesting an updated hearing aid (HA) profile in accordance with the described embodiment. In one embodiment, requestor 304 (in the form of personal communication device, or PCD, 304) can be in communication with hearing aid 302. In one embodiment, the communication between PCD 304 and hearing aid 302 can be wireless. In another embodiment, the communication between PCD 304 and hearing aid 302 can be by way of a wired connection. In any case, requestor PCD 304 can instantiate HA profile update request 306.

In one embodiment, HA profile update request 306 can bundle information that can be used to update an HA profile. For example, HA profile update request 306 can include audio sample 308, calibration audio file 310, and meta-data 312 singly or in any combination. The information included in HA profile update request 306 can be used by the HA profile service to characterize the local audio environment of requestor PCD 304. In one embodiment, audio sample 308 can include noise component N as well as target audio component T. However, in some cases such as prior to arrival or prior to commencement of audio activity, target audio component T may not necessarily be present in audio sample 308. In this case, calibration audio file 310 can be used to determine the background noise characteristics of the local audio environment. Meta-data 312 can include information that can be used to characterize the local audio environment. The information can include images, video, commentary, and so on.

In one embodiment HA profile update request 306 can be passed by way of network 314 to HA profile service 316. Network 314 can refer to one or more data networks, typically, high data-bandwidth networks, namely, wired networks, such as the Internet, Ethernet, gigabit Ethernet, and fiber optic, as well as wireless networks such as IEEE 802.11(a) . . . (n) or ("x") (WiFi), IEEE 802.16 (WiMax), and Ultra-Wide Band (UWB). In one embodiment, network 314 can include server 318. Server 318 can coordinate HA profile update requests and responses between PCD 304 and HA profile service 316. It should be noted that in the context of this discussion, HA profile service 316 will generally take the form of a certified audiologist, technician, or in some cases, an audiologist call center having a number of certified audiologists on call and available to provide the necessary HA update services.

In one embodiment, HA profile service 316 can receive HA profile update request 306 in real time. In another embodiment, HA profile update request 306 can be placed in a queue for subsequent servicing in those situations where the updated HA profile is not needed immediately but can wait until a later date. This is typically the situation when the hearing aid user is preparing to go to a particular event or concert but is not currently at the event. Once HA profile service 316 receives HA update request 306, HA update request 306 can be evaluated. As part of the evaluation, the components of HA update request 306 can be evaluated for the presence of audio sample 308, calibration audio data 310, and requestor supplied meta-data 312. Depending upon the components that are present, HA profile service 316 can update current HA profile 320 stored in hearing aid 302 in accordance with the requirements of HA profile update request 306. In one embodiment, a copy of current HA profile 320 can be included in HA profile update request 306. In another embodiment, a copy of current HA profile 320 can be stored at computing resource 322. For example, as shown in FIG. 3, when HA profile update request 306 includes audio sample 308, calibration audio file 310, and meta-data 312 indicating target audio component T, HA profile service 316 can use the calibration audio data 310 and the target audio component T to evaluate audio sample 308 to obtain an estimate of noise component N. In this way, updated HA profile 324 can include noise correction factor (−N) that can be used by digital hearing aid audio processing 104 to eliminate or at least suppress noise component N.

Updated HA profile 324 can be forwarded back to PCD 304 by way of network 314. PCD 304 can then upload updated HA profile 324 to hearing aid 302. In one embodiment, the hearing aid user can evaluate in real time updated HA profile 324. The real time evaluation can then be passed back to HA profile service 316. If the evaluation is acceptable, then HA profile service 316 can update a local database with the relevant facts such as time, place, identity of hearing aid user, and overall rating of the services provided.

On the other hand, if the evaluation is determined to not be positive, then additional meta-data as well as an updated audio snippet can be forwarded to HA profile service 316. In this way, HA profile service 316 can use the additional information to further update the HA profile in line with the subjective evaluation of the hearing aid user.

Figure 4:
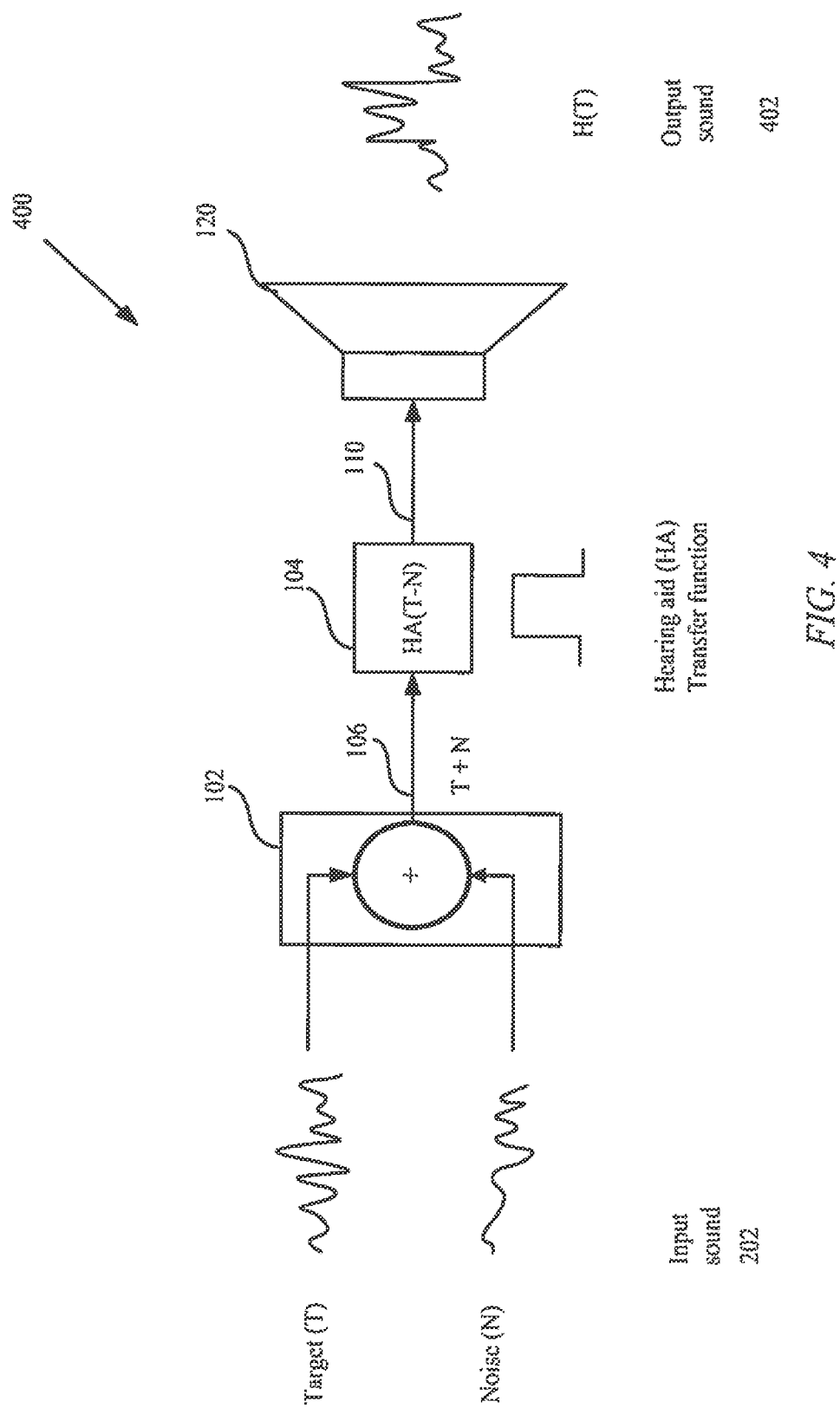
FIG. 4 shows a hearing aid system in accordance with the described embodiments where a hearing aid processes audio using noise compensated hearing aid transfer function.

FIG. 4 illustrates the hearing aid functional diagram of FIG. 2 where current hearing aid transfer function HA(T+N) has been replaced with updated HA profile 324 represented as transfer function HA(T−N). In one embodiment, noise correction factor (−N) can be periodically updated in those situations where noise levels are determined to be changing. In any case, noise correction factor (−N) can be used by digital hearing aid audio processing 104 to at least partially compensate for noise component N. Noise correction factor (−N) can be used by hearing aid 302 to substantially eliminate noise component N resulting in a greatly improved and more enjoyable audio experience for the hearing aid user. More specifically, sound 202 which has been previously described as including noise component N is now processed according to hearing aid transfer function HA(T−N) that at least partially suppresses or eliminates noise component N to produce output sound 402 substantially free of noise.

Figure 5:
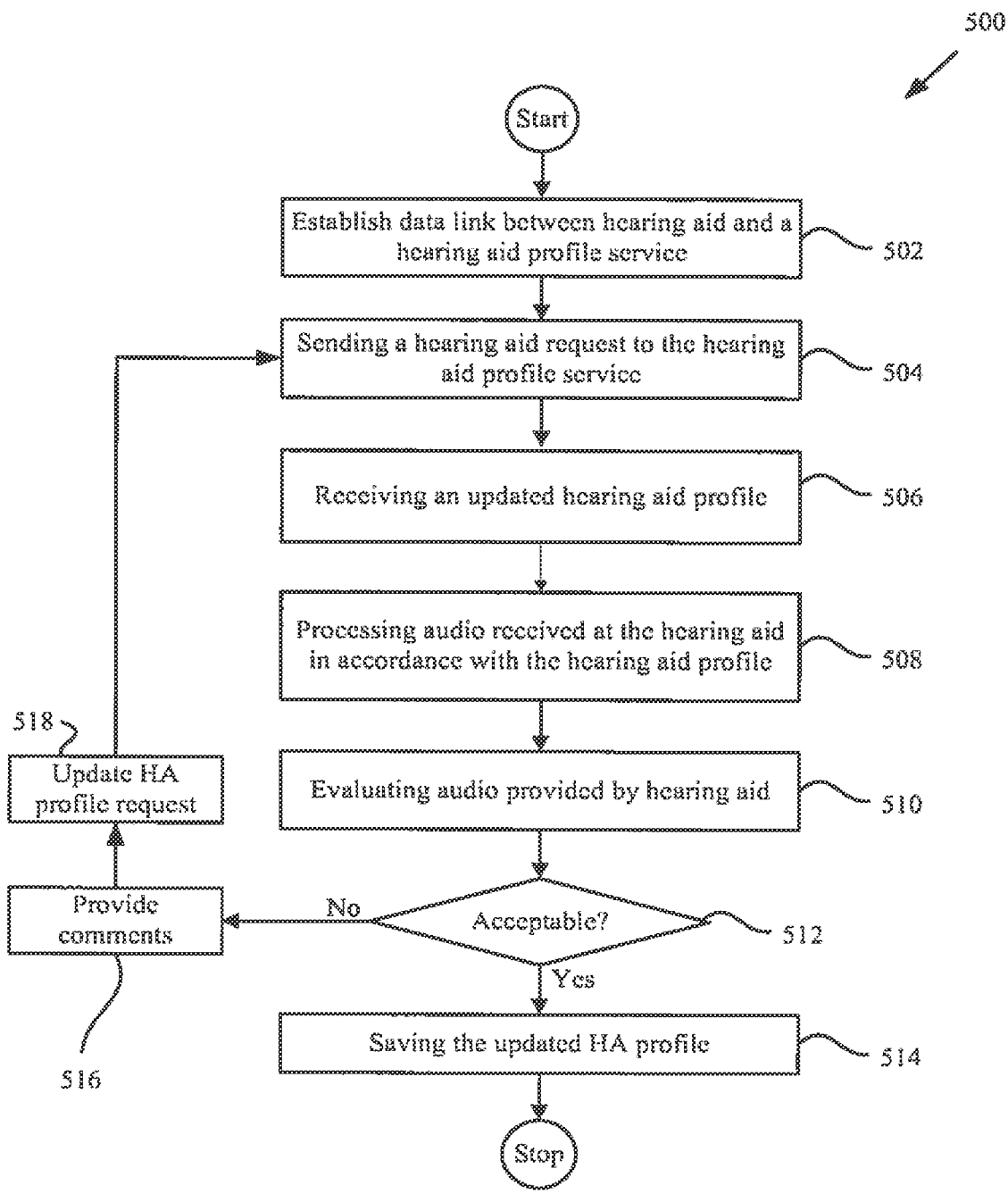
FIG. 5 is a flowchart detailing a process in accordance with the described embodiments for real time updating of audio processing of a hearing aid.

FIG. 5 is a flowchart detailing process 500 in accordance with the described embodiments. Process 500 can be used to update hearing aid profile, in real time. The request can be generated locally by a hearing aid user. The request can be sent by the hearing aid user as a local requestor to an HA profile service by way of a network. In one embodiment, the HA profile service can be remotely located. In any case, the HA profile service includes at least one certified audio technician under the supervision of an audiologist or the audiologist. The updated HA profile can be received by the requestor over the network. In one embodiment, the requester can review the updated HA profile in real time or subsequent to the updating. The review can be forwarded to the HA profile service for subsequent processing. The subsequent processing can include modifying the updated HA profile in accordance with the hearing aid user comments, storing the updated HA profile along with hearing aid user comments in a data base, and so on. Process 500 can be performed over a server based HA network or peer to peer HA network or any combination. Process 500 can be performed by a computing system such as a personal computing device. The personal computing device can include client devices such as a smartphone, tablet device, as well as a desktop computer.

In any case, process 500 can begin at 502 by establishing a data link between a local hearing aid and a HA profile service. In one embodiment, the HA profile service can be locally located. In another embodiment, the HA profile service can be remotely located. The HA profile service can create a new HA profile based upon available information about the requestor or from information provided by the requestor. The data link can be a wireless data link or a wired data link or a combination of wired and wireless. Accordingly, once the data link has been established, at 504 a hearing aid profile update request can be sent by the requestor to the HA profile service. At 506, on updated hearing aid profile is received by the requestor. The updated HA profile replaces a current HA profile used by the hearing aid to process audio at 508. At 510, the audio received at the hearing aid is processed in accordance with the updated HA profile and is evaluated. In one embodiment, the evaluation can be a subjective evaluation by the requestor in the context of use for which the updated HA profile is intended. At 512, if the evaluation is deemed to be acceptable, then the data link is broken down at 514 and process 500 ends, otherwise, control is passed to 516 where comments are provided. The comments can include the evaluation results, suggested changes, updates on the local surroundings and in particular changed aspects of the audio environment, and so on. Once the comments have been provided, control is passed to 518 for updating the HA request with the provided comments. Control is then passed to 504 for handling of the updated request.

Figure 6:
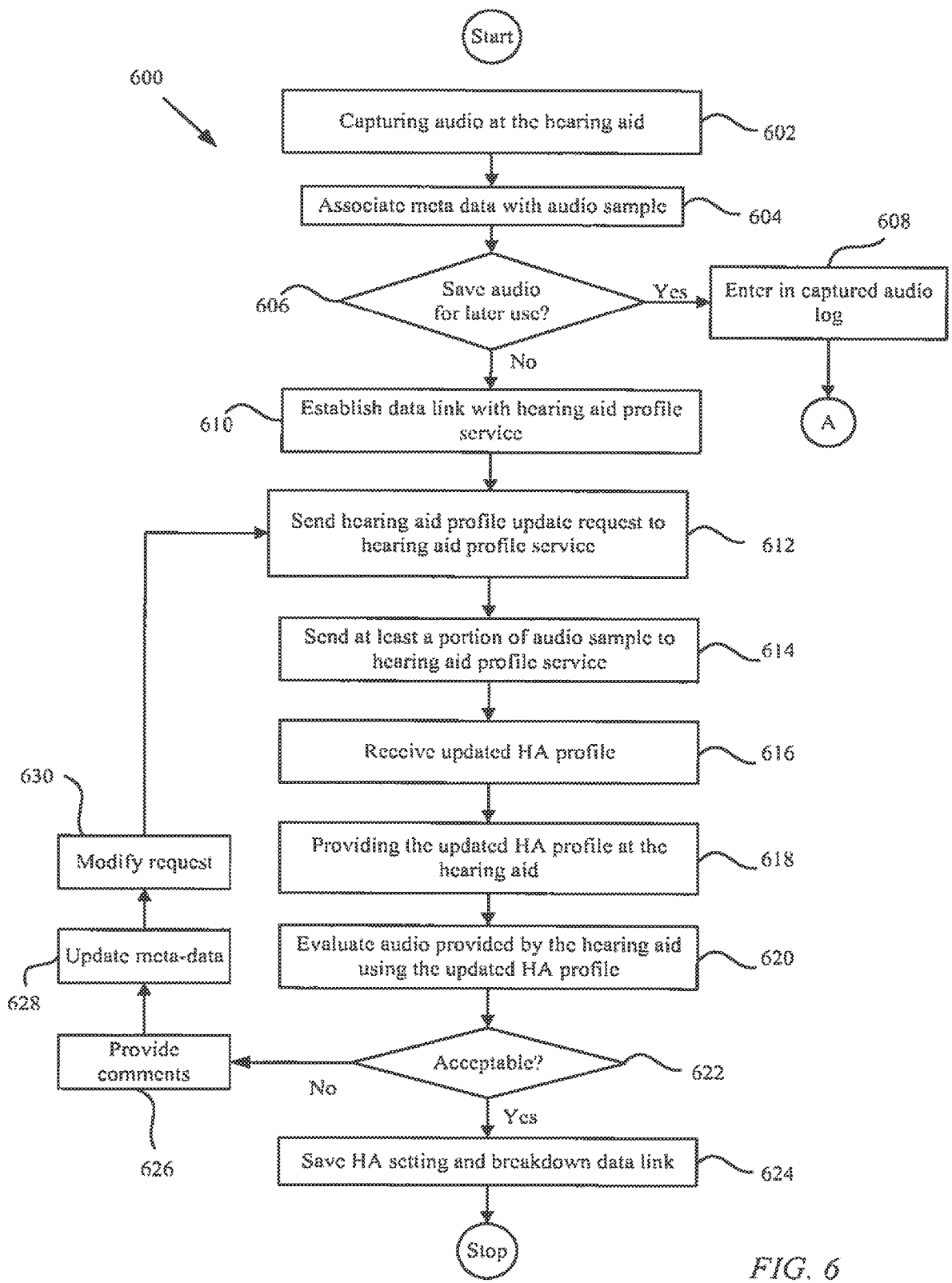
FIG. 6 is a flowchart detailing a process in accordance with the described embodiments for real time updating of audio processing of a hearing aid.

FIG. 6 is a flowchart describing process 600 for updating a hearing aid profile in real time in accordance with the described embodiments. In one embodiment, the hearing aid can be in communication with a personal communication device in possession of the hearing aid user. The personal communication device can include an audio capture device and at least some audio processing capabilities. A processor in the personal communication device can perform at least some of the operations called out and described in the flowchart shown in FIG. 6. In one embodiment, a HA profile service can be in communication with the personal communication device over a network. As such the HA profile service can be remotely located. The HA profile service can be staffed by certified audio technicians under the supervision of at least one audiologist. In one embodiment, the HA profile service can include the audiologist, or as a call center, a plurality of audio technicians and/or certified audiologists.

Process 600 can begin at 602 by capturing audio in real time. The captured audio can represent a local audio environment of the hearing aid user. Typically, the captured audio includes a target audio portion and a noise portion. The target audio portion can be representative of a desired audio content whereas the noise portion can represent any other audio content. The audio sample can be of any appropriate length but should be long enough to capture enough sound to provide a reasonable representation of the local audio environment. At 604, meta-data can be associated with the audio sample. The meta-data can an annotation indicating a time/place/location of the audio sample. In one embodiment, the meta-data can indicate a hearing aid user's comments about the audio sample. For example, the comments can indicate the hearing aid user's reaction (positive, negative, or neutral) regarding the audio sample, and so on. If at 606 the audio sample is used to provide a HA profile update at a later date, then at 608, the audio sample is saved to a captured audio log. The captured audio data log can include audio samples from other days, times, or wherever or whenever the hearing aid user decided to record and log the audio sample.

For example, if the hearing aid user notices that under certain conditions, the quality of the sound from the hearing aid is enhanced (or degraded), the hearing aid user can record the sound as it being received at the hearing aid as the audio sample. The hearing aid user can then comment on the audio sample and store audio sample along the comments (and any other information that may be useful to the HA profile service) in the captured audio log for subsequent processing. In one embodiment, the subsequent processing can used to provide an updated HA profile in a manner shown and described in FIG. 7.

Returning to 606, if the audio sample is to be used to provide a contemporary updated HA profile, and then at 610, a data link is established between the personal communication device (PCD) and a remotely located HA profile service at 610. The data link can be established over a network. The network can include a server computer and affiliated client devices, at least one of which can be associated with the remote HA profile service. At 612, an HA profile update request is sent over the network to the HA profile service. In one embodiment, the HA profile update request can include meta-data. The meta-data can include information such as an indication of a current location of the requestor and any comments provided by the requestor. At 614, at least a portion of the captured audio sample is forwarded to the HA profile service. In one embodiment, the captured audio sample can be included as part of the HA profile update request. In one embodiment, the captured audio sample can be provided subsequent to the HA profile update request. In one embodiment, in addition to the captured audio sample, an audio calibration file can be forwarded to the HA profile service where the audio calibration file can be used in part to distinguish a target audio component and a noise component in the captured audio. The audio calibration file can also be used to characterize a local audio environment of the hearing aid user.

At 616, an updated HA profile is received from the HA profile service and at 618, the updated HA profile is provided to the hearing aid. In one embodiment, the updated HA profile overlays a portion of the current HA profile. In either case, at 620, the audio provided by the hearing aid in accordance with the updated HA profile is evaluated. At 622, if the evaluation is determined to be acceptable, then at 624, the data link is broken down and process 600 ends. On the other hand, if at 622, the evaluation is determined to not be acceptable, and then control is passed to 626 where the hearing aid user can provide comments. At 628, the meta-data can be updated and at 630, the HA profile request can be modified to include the meta-data and the comments. Control is then passed bot 612 for further processing.

Figure 7:
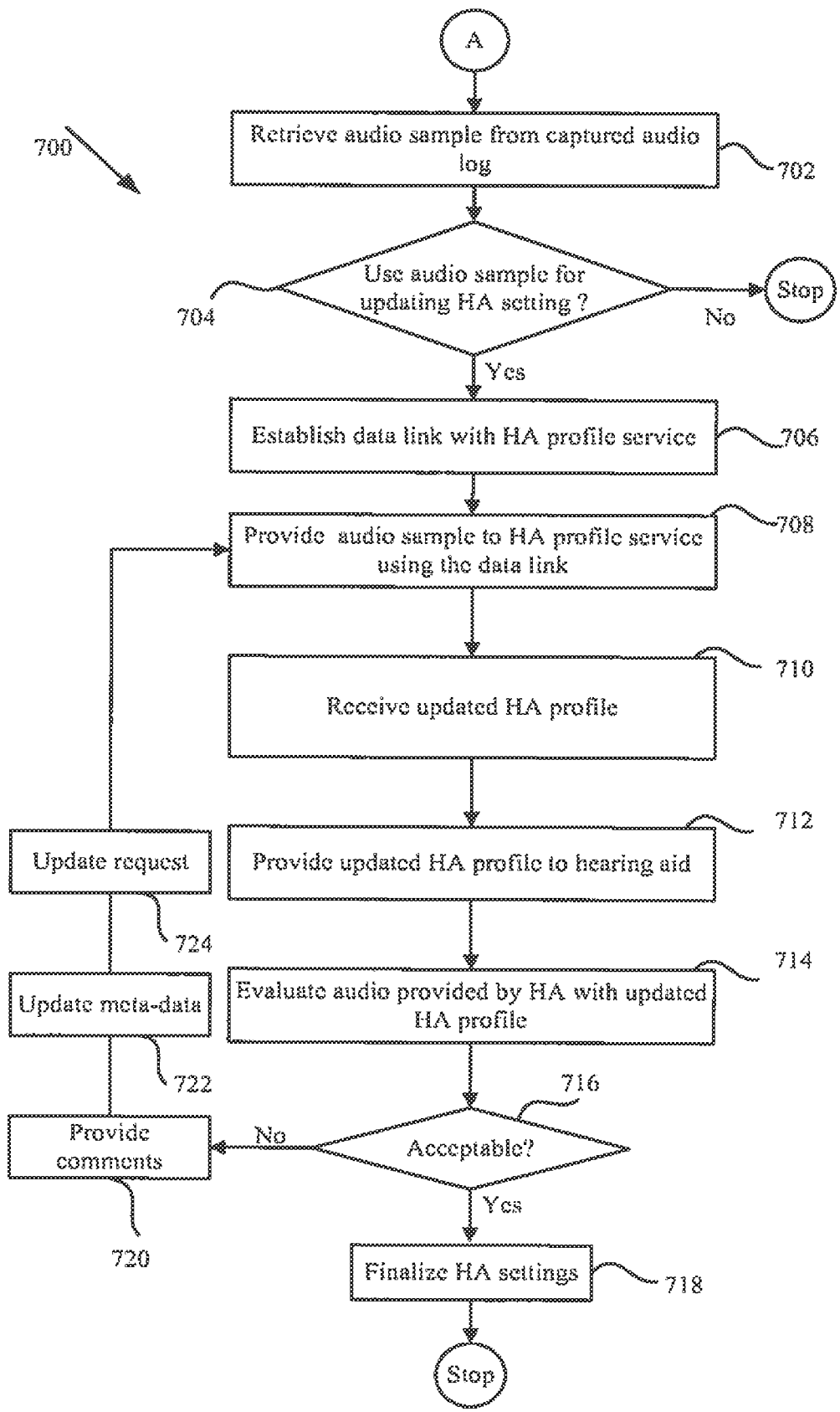
FIG. 7 is a flowchart detailing a process in accordance with the described embodiments for using an audio log to update a hearing aid profile.

FIG. 7 is a flowchart describing process 700 for remotely updating a hearing aid profile in accordance with the described embodiments. In one embodiment, the hearing aid can be local to a hearing aid user. The hearing aid can be in communication with a personal communication device in possession of the hearing aid user. Process 700 can be used to update the HA profile when a log of audio sample(s) is available. The audio samples can be annotated by the hearing aid user. The annotation can be in the form of meta-data associated with each audio sample. In one embodiment, an image or a video of the local surroundings can also be associated with the audio sample. The image or video can be used to provide an estimate of the local audio characteristics that can be related to properties shown in the image or video such as room size and shape, furniture placement, carpets, and so forth.

Accordingly at 702, an audio sample included in the data log can be retrieved. If at 704, a determination is made whether or not the retrieved audio sample is to be used to update an HA profile. If the determination is that the audio sample is not to be used to update an HA profile, then process 700 ends, otherwise, at 706 a data link to an HA profile service is established and the audio sample is forwarded to an HA profile service at 708. The HA profile service can be remotely located and be in communication with the hearing aid user by way of a network. At 710, an updated HA profile is received where at least part of the updated HA profile is based upon the audio sample. In one embodiment, the audio sample can include a calibration audio file used by the HA profile service to update the HA profile. The calibration audio file can include a calibrated audio data that can be used to distinguish between a target audio component and a noise component.

At 712, the updated HA profile is provided to a hearing aid. In one embodiment, the updated HA profile can replace a current HA profile in the hearing aid. In one embodiment, the updated HA profile can overlay a portion of the current HA profile, in particular, overlaying only those portions of the current HA profile that differ from the updated HA profile. At 714, audio processed by the hearing aid in accordance with the updated HA profile is evaluated.

In one embodiment, the evaluation can be objective in that the evaluation can be based upon specific audio characteristics such a frequency distribution modification. In one embodiment, the evaluation can be subjective based upon how the hearing aid user perceives the processed audio. In either case, if at 716, the evaluation indicates that the updated HA profile is acceptable, then the HA settings are finalized at 718. On the other hand, if the evaluation indicates that the updated HA profile is not acceptable, then at 720 comments by the hearing aid user are provide based in part on the evaluation. At 722, meta-data is updated and at 724, the HA profile update request is updated after which control is passed to 708 for further processing.

Figure 8:
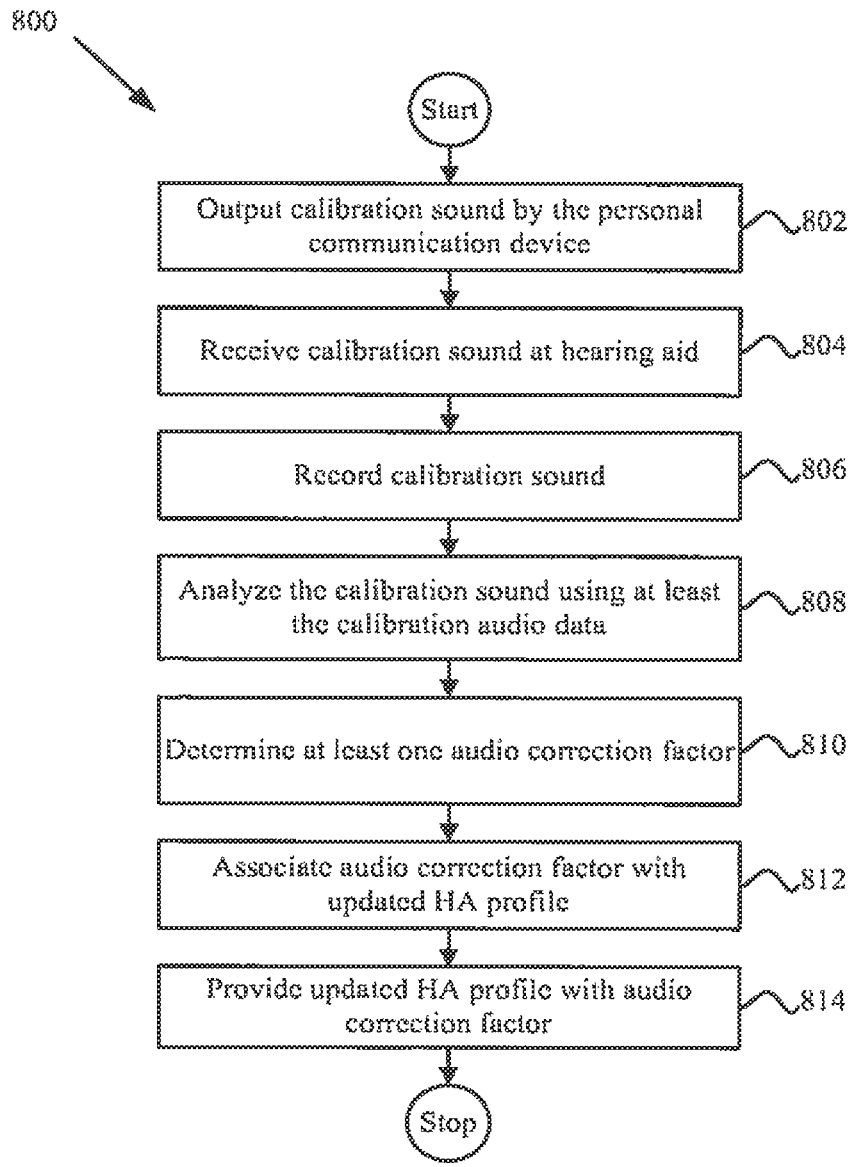
FIG. 8 is a flowchart detailing a process for determining a noise correction factor in accordance with the described embodiments.

FIG. 8 is a flowchart describing process 800 for analyzing an audio environment of a hearing aid in accordance with an embodiment of the invention. In one embodiment, the analysis can be used to update a HA profile used by the hearing aid to process audio received at the hearing aid. In one embodiment, the audio sample can be procured in real time from a local audio environment of a hearing aid user. In one embodiment, the audio sample can be procured from a data file of audio samples at least some of which can have associated meta-data. The meta-data providing information that can include at least a time stamp indicating a date/time that the audio sample was captured, heating aid user comments about the audio sample, and so forth. In one embodiment, the hearing aid can be in communication with a personal communication device having a speaker and arranged to play an audio file for output at the speaker. In general, process 800 describes a method for analyzing the effects that a local environment has on audio within the environment. The analysis can determine any systemic changes that the local environment has on the audio. The systemic changes can be related to the physical nature of the environment, presence of noise in the environment, and so on. The analysis can then be used to generate correction factors that can be incorporated into the HA profile for the hearing aid. The correction factors can correct for noise and affects such as echo and reverberation caused by physical aspects of the local environment.

In one embodiment, process 800 can begin at 802 outputting calibration sound by the personal communication device. In one embodiment, the calibration sound can be generated by playing the calibration audio data by the personal communication device. In one embodiment, the calibration sound can take the form of, for example, a tone or series of tones, received at hearing aid at 804. The calibration sound received at the hearing aid can then be recorded at 806 and analyzed at 808. In one embodiment, the calibration sound received at the hearing aid can be recorded and stored in the personal communication device where the analysis can take place. In one embodiment, the hearing aid can record the received calibration sound and transfer the recorded calibration sound as a data file to the personal communication device for further processing. This may be necessary in those situations where the hearing aid does not possess sufficient computing resources to carry out the requisite audio analysis. In one embodiment, at least part of the analysis involves comparing the original calibration sound to the calibration sound received at the hearing aid. The comparing can indicate any changes promulgated by the local environment on the original calibration sound. In one embodiment, at least one correction factor can be determined at 810, the correction factor being based upon the analysis of the calibration sound received at the hearing aid. In one embodiment, at least one correction factor can be used to suppress or in some cases substantially eliminate noise in the local environment. The noise in the local environment can be related to audio sources other than those associated with a target audio source. For example, then the hearing aid user if present at a rock concert, the music being played can be considered the target audio whereas the sounds of the crowd can be considered noise. The at least one correction factor can be associated with an updated HA profile at 812 that is then provided to the hearing aid at 814.

In one embodiment, the calibration audio data can include known audio data that can represent particular audio environments such as quiet, noisy, and so on. In one embodiment, the calibration audio data can include audio data specific for the hearing aid user. For example, if the hearing aid user has a specific hearing deficit (such as age related high frequency deficit), then the audio data can provide a more detailed set of audio data corresponding to the particular hearing deficit. As part of the analysis, the audio sample can be shifted from the time domain to the frequency domain using, for example, a Fourier Transform and back again using an inverse Fourier Transform. In this way, the analysis can be more easily performed on digital computers and provide more information in a shorter amount of time.

As part of the analysis, a noise component can be determined. The noise component can be determined by using a target audio component provided by the hearing aid user. In one embodiment, the target audio component can be compared to the audio sample and the audio calibration data to resolve the noise component. A noise correction factor can be developed based upon the noise component. The noise correction factor can be used by the hearing aid to suppress or eliminate noise from the processed audio output by the hearing aid to the hearing aid user. The noise correction factor can be added to or otherwise associated with the updated HA profile that can then be used by the hearing aid to process audio received at the hearing aid.

Figure 9:
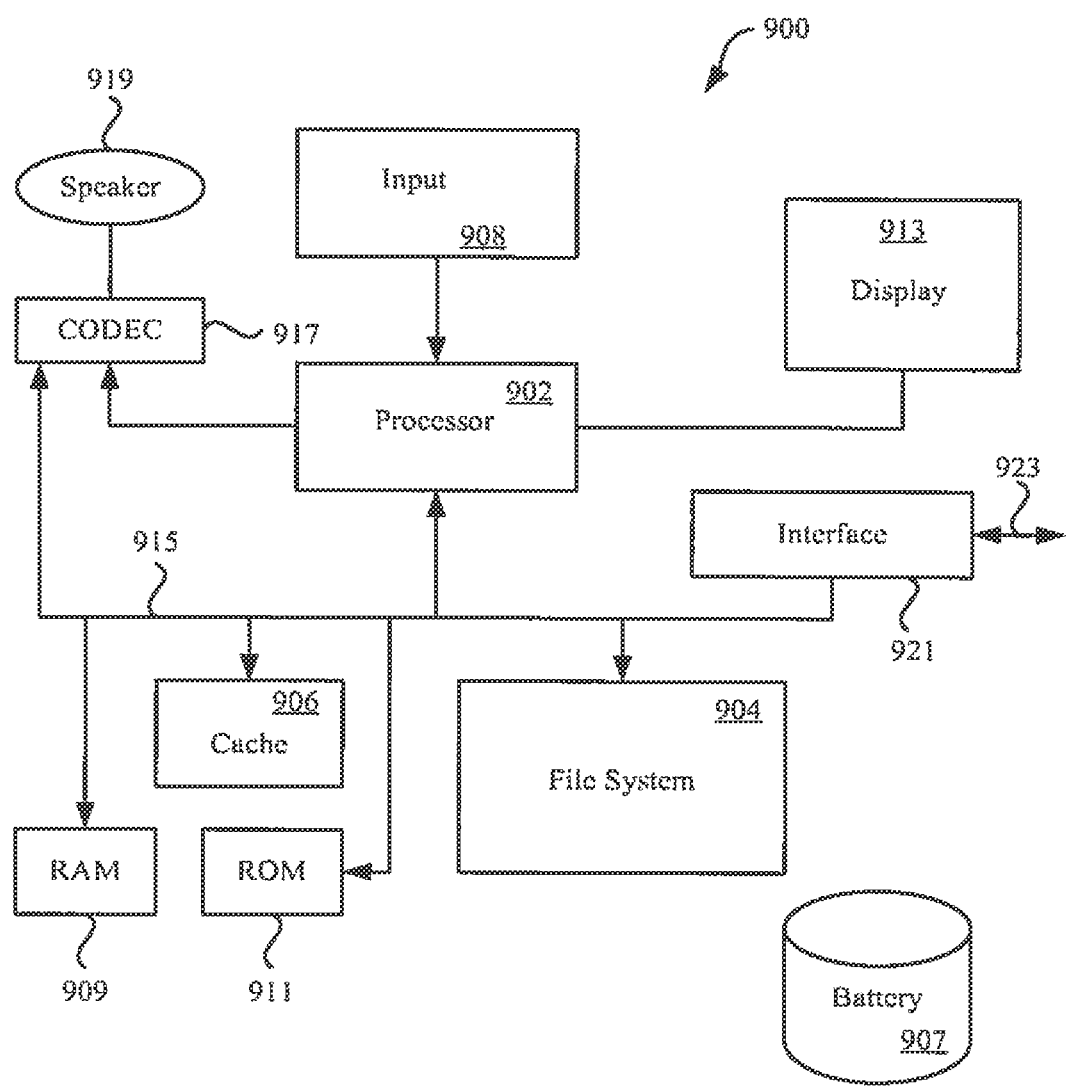
FIG. 9 shows a representative computing system in accordance with the described embodiments.

FIG. 9 is a block diagram of an electronic device 900 suitable for use with the described embodiments. The electronic device 900 illustrates circuitry of a representative computing device. The electronic device 900 includes a processor 902 that pertains to a microprocessor or controller for controlling the overall operation of the electronic device 900. The electronic device 900 stores media data pertaining to media items in a file system 904 and a cache 906. The file system 904 is, typically, a storage disk or a plurality of disks. The file system 904 typically provides high capacity storage capability for the electronic device 900. However, since the access time to the file system 904 is relatively slow, the electronic device 900 can also include a cache 906. The cache 906 is, for example, Random-Access Memory (RAM) provided by semiconductor memory. The relative access time to the cache 906 is substantially shatter than for the file system 904. However, the cache 906 does not have the large storage capacity of the file system 904. Further, the file system 904, when active, consumes more power than does the cache 906. The power consumption is often a concern when the electronic device 900 is a portable media device that is powered by a battery 907. The electronic device 900 can also include a RAM 909 and a Read-Only Memory (ROM) 911. The ROM 911 can store programs, utilities or processes to be executed in a non-volatile manner. The RAM 909 provides volatile data storage, such as for the cache 906.

The electronic device 900 also includes a user input device 908 that allows a user of the electronic device 900 to interact with the electronic device 900. For example, the hearing aid user input device 908 can take a variety of forms, such as a button, keypad, dial, touch screen, audio input interface, visual/image capture input interface, input in the form of sensor data, etc. Still further, the electronic device 900 includes a display 913 (screen display) that can be controlled by the processor 902 to display information to the hearing aid user. A data bus 915 can facilitate data transfer between at least the file system 904, the cache 906, the processor 902, and the CODEC 917.

In one embodiment, the electronic device 900 serves to store a plurality of media items (e.g., songs, podcasts, etc.) in the file system 904. When a user desires to have the electronic device play a particular media item, a list of available media items is displayed on the display 913. Then, using the hearing aid user input device 908, a user can select one of the available media items. The processor 902, upon receiving a selection of a particular media item, supplies the media data (e.g., audio file) for the particular media item to a coder/decoder (CODEC) 917. The CODEC 917 then produces analog output signals for a speaker 919. The speaker 919 can be a speaker internal to the electronic device 900 or external to the electronic device 900. For example, headphones or earphones that connect to the electronic device 900 would be considered an external speaker.

The electronic device 900 also includes a network/bus interface 921 that couples to a data link 923. The data link 923 allows the electronic device 900 to couple to a host computer or to accessory devices. The data link 923 can be provided over a wired connection or a wireless connection. In the case of a wireless connection, the network/bus interface 921 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The many features and advantages of the present embodiments are apparent from the written description and, thus, it is intended by the appended claims to cover all such features and advantages of the described embodiments. Further, since numerous modifications and changes will readily occur to those skilled in the art, the described embodiments should not be limited to the exact construction and operation as illustrated and described. Hence, all suitable modifications and equivalents may be resorted to as falling within the scope of the described embodiments.

As described above, one aspect of the present technology is the gathering and use of data available from specific and legitimate sources to improve the delivery to users of improved auditory performance by one or more devices. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver improved auditory performance by one or more devices.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A media device comprising:
    a memory to store a hearing profile for the media device; and
    a processor coupled to the memory and configured to:
        send a hearing profile update request to an external device which is separate from the media device, wherein the hearing profile update request comprises captured audio that represents a local audio environment of the media device and metadata that characterizes the local audio environment of the captured audio,
        receive from the external device an update to the hearing profile in response to the hearing profile update request, and
        store in the memory an updated hearing profile that is in accordance with the update.

2. The media device of claim 1, wherein the processor is further configured to perform audio processing according to the updated hearing profile, and wherein the hearing profile update request is sent by the processor in response to a request from a user of the media device.

3. The media device of claim 2, wherein the metadata comprises commentary data and the update is generated based on having processed the commentary data.

4. The media device of claim 3, wherein the commentary data comprises comments by a user of the media device.

5. The media device of claim 3, wherein the captured audio is a recording made by the media device of a calibration sound in the local audio environment.

6. The media device of claim 1, wherein the processor is further configured to store the captured audio to a captured audio log that includes captured audio from other days or from other times.

7. The media device of claim 6, wherein the captured audio log includes captured audio from whenever or wherever a user of the media device decided to record and log captured audio.

8. The media device of claim 1, wherein the updated hearing profile includes an adjustment to a noise component.

9. The media device of claim 1, wherein a hearing profile service coupled to the media device through a wireless network processes the hearing profile update request to generate the update.

10. The media device of claim 6, wherein the processor is further configured to store the captured audio to a captured audio log that includes captured audio from other days or from other times and the update received from the external device comprises the updated hearing profile.

11. An electronic device comprising:
    a memory to store a hearing profile related to a media device coupled to the electronic device; and
    a processor coupled to the memory and configured to implement one or more applications to:
        receive a hearing profile update request from the media device, wherein the hearing profile update request comprises i) captured audio that represents a local audio environment of the media device and ii) metadata that characterizes the local audio environment;
        produce an update to the hearing profile based on the captured audio and the metadata received in the hearing profile update request; and
        send the update to the media device in response to the hearing profile update request, wherein an updated hearing profile that is in accordance with the update is stored in the media device.

12. The electronic device of claim 11, wherein the hearing profile update request is sent by the media device in response to a request from a user of the media device.

13. The electronic device of claim 11, wherein the metadata comprises audio characteristics being an amount of reverberation or echo.

14. The electronic device of claim 11, wherein the metadata comprises audio characteristic being an amount of background noise.

15. The electronic device of claim 11 wherein the updated hearing profile includes an adjustment to a noise component.

16. The electronic device of claim 11, wherein the electronic device is to forward the hearing profile update request to a hearing profile service on a server coupled to a network.

17. The electronic device of claim 11 wherein the update comprises the updated hearing profile.

18. A non-transitory computer-readable medium including instructions, which if executed by a computing device, causes the computing device to implement an operation comprising:
    sending a hearing profile update request to an external device which is separate from the computing device, wherein the hearing profile update request comprises captured audio of a local audio environment of the computing device, and metadata that characterizes the local audio environment;
    receiving from the external device an update to a hearing profile in response to the hearing profile update request; and
    storing an updated hearing profile in accordance with the received update, in a memory of the computing device.

19. The non-transitory computer-readable medium of claim 18 including instructions that configure the computing device to perform audio processing according to the updated hearing profile and wherein the hearing profile update request is sent in response to a request from a user of the computing device.

20. The non-transitory computer-readable medium of claim 18, wherein the instructions configure the computing device to store the captured audio to a captured audio log that includes captured audio from other days or from other times.

* * * * *